UNITED STATES PATENT OFFICE.

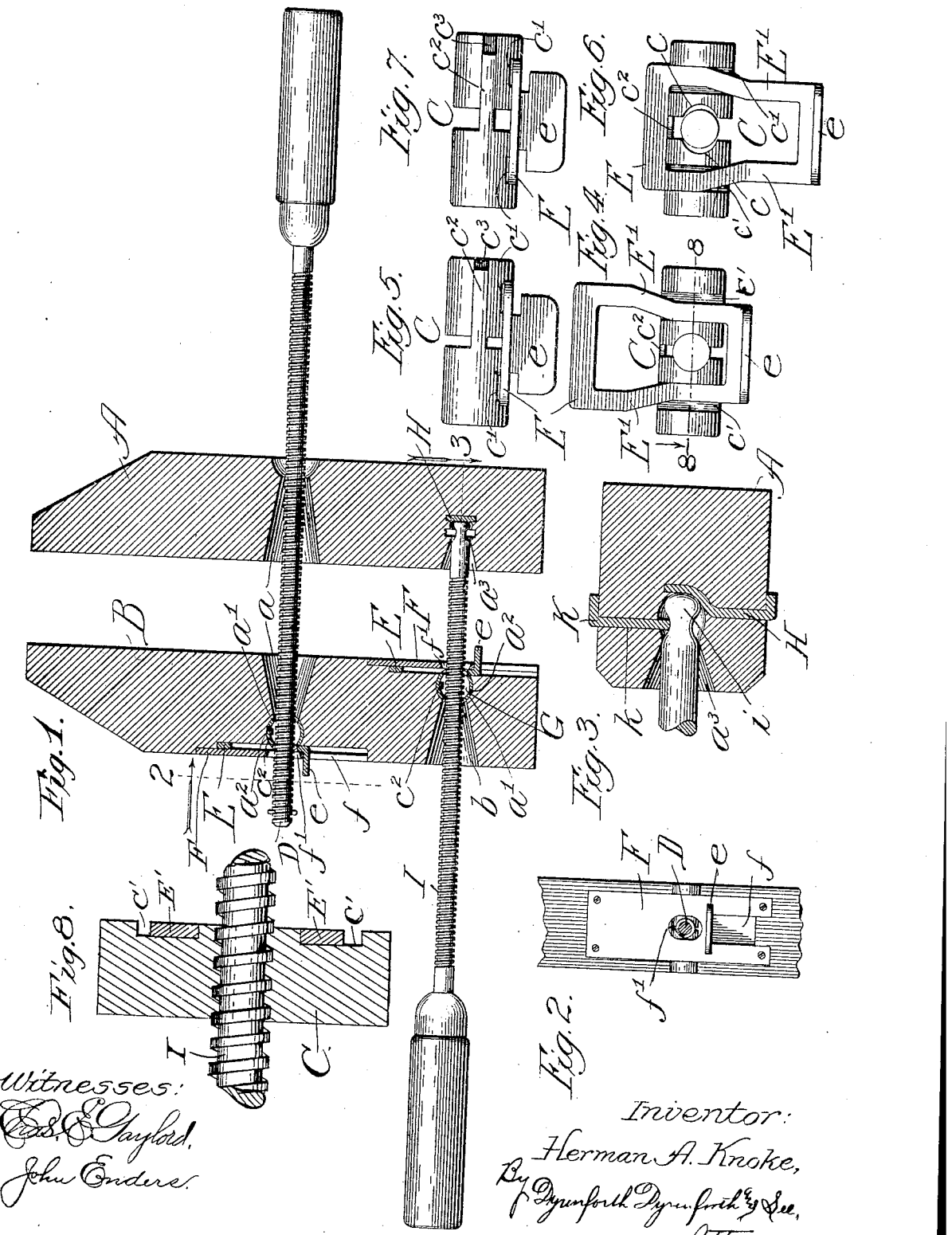

HERMAN A. KNOKE, OF CHICAGO, ILLINOIS.

CLAMP.

No. 810,543. Specification of Letters Patent. Patented Jan. 23, 1906.

Application filed January 25, 1905. Serial No. 242,692.

*To all whom it may concern:*

Be it known that I, HERMAN A. KNOKE, a citizen of the United States, residing at Chicago, in the county of Cook and State of Illinois, have invented a new and useful Improvement in Clamps, of which the following is a specification.

My invention relates to an improvement in the class of clamps used in carpenter and cabinet work, in which the jaws are adjustably connected by a screw passing through them near the rear end of the clamp and a similar screw passing through them in the opposite direction near their transverse centers, each screw having its bearings secured to the jaws to extend across the latter at right angles to them for adapting the jaws to be set at different relative positions.

My object is to provide a construction of clamp in the class thus referred to which is adapted to permit of its ready adjustment approximately to any dimensions of work to be held together thereby by throwing the screws out of engagement with their bearings on the jaws and then sliding the jaws upon the screws to effect an approximate adjustment without requiring manipulation of the screws, thus obviating the loss of time and labor by effecting an approximate adjustment of the jaws when it is required to be done by turning the screws in their bearings.

Referring to the accompanying drawings, Figure 1 illustrates my improved clamp by a longitudinal section through the jaws. Fig. 2 is a broken plan view, partly in section, taken at line 2 on Fig. 1 and viewed in the direction of the arrow, illustrating the preferred means employed for disengaging the screw-bearing from the screw. Fig. 3 is a broken section taken at line 3 on Fig. 1 and viewed in the direction of the arrow. Fig. 4 is a view showing in elevation the details of the sectional nut affording the separable screw-bearing of the preferred construction for spreading the parts, illustrated in their closed position for engaging the screw. Fig. 5 is a plan view of the same. Figs. 6 and 7 are views in elevation and plan, respectively, of the same parts shown in Figs. 4 and 5, but representing the separable parts of the nut in their separated condition for freeing the screw; and Fig. 8 is a section taken at the line 8 on Fig. 4 and viewed in the direction of the arrow.

A and B are the jaws, each of which is provided near its center with a transverse screw-opening $a$. A nut C, forming a screw-bearing composed of two longitudinally-separable sections and which is preferably made in cylindrical form, is housed within a bushing $a^2$, secured in an opening $a'$ in the jaw B at a right angle to the aperture $a$. A hand-screw D passes through the aperture $a$ of the jaw A and through a threaded opening $c$ in the nut C, at which opening the nut is divided. The nut C is made, preferably, in two sections, as shown, each provided with transverse recesses or grooves $c'$ on opposite sides of the threaded opening $c$ to receive the side arms $E'$ $E'$ of a cam-frame E, which is provided with a thumb-piece $e$, projecting outward from the jaw to permit its manipulation. The bottoms of the grooves $c'$ should be rounded, as shown in Figs. 4 and 6, to permit the cam-arms to continue in engagement in the rotation of the nut in its bearing, thus to permit setting of the jaws to the various angles required in applying them. The cam-frame is held in place by a plate F, secured to the side of the jaw, as by screws, and is provided with a slot $f$, through which the thumb-piece projects and in which it slides, and with an aperture $f'$, through which the screw passes. One of the separable sections of the nut is provided with a longitudinally-extending feather $c^2$, which overlaps the other nut-section and slides in a groove $c^3$ in the last-named section, the better to insure alinement of the parts and to prevent independent rotation thereof.

Near the rear end of the jaw B is an aperture $b$, in which is housed a sectional nut G with cam mechanism for operating it, the whole being a duplicate of the parts described as being located in the aperture $a$ of the jaw B. In the jaw A is provided a socket $a^3$ to register with the aperture $b$, and it is equipped at its inner end with a bearing-plate H, which serves as an abutment for a hand-screw I, provided on its inner end with a head $i$, adjacent to which it is straddled by the bifurcated end of a plate K, removably inserted into an opening $k$ in a side of the jaw A to hold the screw in place against withdrawal while the jaws are being operated.

The operation of adjusting the jaws to set them is as follows: The jaws are first approximately adjusted to the dimensions of the work by sliding them on the screws D and I in the required direction after first drawing the cam-frames E at their thumb-pieces $e$ toward the rear end of the jaws to free the screws. This slides the cams in their grooves $c'$ in the separable nut-sections, with the effect of separating the latter and so enlarging the screw-openings c therein as to disengage them from the screws. The screws D and I being then free of engagement with the screw-bearings readily slide through the enlarged nut-openings in either direction, thus permitting the jaws to be quickly adjusted approximately to clamp the work. When this adjustment is effected, the cams are slid back to their original positions, (shown in Figs. 4 and 5,) thereby reducing the nut-openings to their normal size to engage the threads of the screws D and I. The jaws are then set to tightly clamp the work to be held by them by tightening the screws in the usual manner.

The construction thus described permits spreading the jaws to different angles to adapt the clamp to work of different dimensions, the nuts being rotatably confined in their housings and the openings through which the screws pass being either flaring, as shown, or straight and sufficiently wide to avoid binding.

If desired, my improvement may be applied in the manner of applying the screw-bearings on the jaws according to the construction set forth in my application for Letters Patent, filed May 6, 1904, Serial No. 206,670.

While I have shown and described my improved clamp in its preferred form, involving the sectional nut for each screw with the attending operating parts, thus enabling the ready adjustment of the jaws over both screws, I do not wish to be understood as limiting my invention to such a construction, as it contemplates the use of but one sectional nut for one of the screws and any other suitable bearing for the other screw. Moreover, the construction of the sectional nut and that of the cam mechanism for operating it, as also the manner of connecting it with the jaw of a clamp, may be variously modified by those skilled in the art without departure from my invention.

What I claim as new, and desire to secure by Letters Patent, is—

1. In a clamp formed of a pair of coöperating jaws provided with operating-screws, a screw-bearing comprising a nut formed of separable sections rotatably supported on a jaw, and means for separating said sections to free the screw and for bringing them together to adapt the screw to engage operatively therewith, for the purpose set forth.

2. In a clamp formed of a pair of coöperating jaws provided with operating-screws, a screw-bearing comprising a nut formed of longitudinally-separable sections rotatably supported on a jaw, and means for separating said sections to free the screw and for bringing them together to adapt the screw to engage operatively therewith, for the purpose set forth.

3. In a clamp formed of a pair of coöperating jaws provided with operating-screws, a screw-bearing comprising a nut formed of two separable sections rotatably supported on a jaw, and means for separating said sections to free the screw and for bringing them together to adapt the screw to engage operatively therewith, for the purpose set forth.

4. In a clamp formed of a pair of coöperating jaws provided with operating-screws, a screw-bearing comprising a nut formed of two separable sections rotatably supported on a jaw, a tongue on one of said sections and a groove in the other section to coöperate with said tongue, and means for separating said sections to free the screw and for bringing them together to adapt the screw to engage operatively therewith, for the purpose set forth.

5. In a clamp formed of a pair of coöperating jaws provided with operating-screws, a screw-bearing secured to one of said jaws, comprising a nut formed of separable sections rotatably housed in the jaw transversely thereto, and an aperture in the other jaw to register with said screw-opening, and means for separating said sections to free the screw and for bringing them together to adapt the screw to engage operatively therewith, for the purpose set forth.

6. In a clamp, the combination of a pair of coöperating jaws provided with operating-screws, a screw-bearing comprising a nut formed of separable sections provided with transverse grooves, and a cam-frame confined at its arms in said grooves and operative to spread said sections apart and bring them together, for the purpose set forth.

7. In a clamp formed of a pair of coöperating jaws provided with operating-screws, a screw-bearing comprising a nut rotatably housed in a jaw and formed of separable sections endwise abutting to form the threaded opening, and cam mechanism engaging said nut to spread the sections apart and force them together.

8. In a clamp, the combination of a pair of coöperating jaws, screw-bearings secured to one of said jaws, each comprising a nut rotatably supported on said jaw and composed of two sections forming the threaded opening between them, cams engaging said sections for longitudinally separating them and bringing them together, and operating-screws for the jaws working in said screw-bearings.

9. In a clamp, the combination of a jaw, screw-bearings journaled in said jaw transversely thereto near its center and near its rear end, respectively, each comprising a nut formed of two longitudinally-separable sections, cams for separating said sections, a companion jaw coöperating with said first-named jaw, provided near its center with a transverse aperture and near its rear end with a socket, screws for operating said jaws, one screw passing through said aperture and screw-bearing opposite thereto and the other screw passing through the other said screw-bearing and releasably confined in said socket, for the purpose set forth.

10. A clamp comprising, in combination, a pair of jaws, one of said jaws having screw-openings respectively near its center and rear end, with openings forming nut-housings extending across said screw-openings respectively near the back and face of the jaw, nuts rotatably confined in said housings each nut being formed of separable sections, cams supported on said jaw to operatively engage said nuts for separating and bringing together said sections, the other jaw having screw-openings to register with those in the first-named jaw, and screws working in opposite directions in said jaw-openings through said nuts, for the purpose set forth.

11. A clamp comprising, in combination, a pair of jaws, one of said jaws having screw-openings respectively near its center and rear end, with openings forming nut-housings extending across said screw-openings and containing bushings, nuts rotatably confined in said bushings, each nut being divided through its threaded opening into separable sections, cams supported on said jaw to operatively engage said nuts for separating and bringing together said sections, the other jaw having screw-openings to register with those in the first-named jaw, and screws working in opposite directions in said jaw-openings through said nuts, for the purpose set forth.

12. A clamp comprising, in combination, a pair of jaws, one of said jaws having screw-openings respectively near its center and rear end, with openings forming nut-housings extending across said screw-openings, nuts confined in said nut-openings, each nut being divided through its threaded opening into two separable sections, said sections being provided with cam-receiving grooves, a cam for each nut, comprising a cam-frame adjustably confined on said jaw with its arms engaging the sections of a nut at said grooves therein, the other jaw having screw-openings to register with those in the first-named jaw, and screws working in opposite directions in said jaw-openings through said nuts, for the purpose set forth.

13. A clamp comprising, in combination, a pair of jaws, one of said jaws having screw-openings respectively near its center and rear end, with openings forming nut-housings extending across said screw-openings, nuts confined in said nut-housings, each nut being divided through its threaded opening into two separable sections, said sections being provided with cam-receiving grooves, a cam for each nut comprising a cam-frame adjustably confined on said jaw with its arms engaging the sections of a nut at said grooves therein, the other jaw having a screw-opening between its ends and a socket near its rear end, a screw working in one direction through said central openings in both jaws and through the nut in one said opening, a headed screw working through the other nut in the jaw provided therewith and entering the socket in the opposite jaw, and means for releasably confining said headed screw in said socket, for the purpose set forth.

HERMAN A. KNOKE.

In presence of—
W. B. DAVIES,
J. H. LANDES.